Oct. 9, 1951 N. W. ARAM 2,570,187
SUBSCRIBER SIGNALING SYSTEM
Filed July 21, 1948 2 Sheets-Sheet 1

NATHAN W. ARAM
*INVENTOR.*
BY Bruce L. Birchard
*HIS AGENT*

NATHAN W. ARAM
*INVENTOR.*

BY Bruce L. Birchard
*HIS AGENT*

Patented Oct. 9, 1951

2,570,187

UNITED STATES PATENT OFFICE 2,570,187

SUBSCRIBER SIGNALING SYSTEM

Nathan W. Aram, Park Ridge, Ill., assignor to Zenith Radio Corporation, a corporation of Illinois Application July 21, 1948, Serial No. 39,970

7 Claims. (Cl. 178—5.1)

This invention relates to coded electrical signalling systems, and more particularly to such signalling systems in which electrical signals are transmitted in coded form, and key signals for decoding the electrical signals are transmitted by wire line conductor solely to subscriber receivers.

It is an object of this invention to provide such a system in which coded electrical signals are radiated on a suitable carrier wave, and key signals for decoding the coded signals are transmitted to subscriber receivers by telephone lines, power lines, or the like, and wherein an automatic switching device is provided at each subscriber receiver for impressing the key signals upon decoding circuits in the receiver when such a device is energized, and for disconnecting the key signals from the decoding circuits when the device is de-energized.

Another object of this invention is to provide such a signalling system in which a standard identifying signal is transmitted concomitantly with the coded electrical signal, which standard signal energizes the switching device only during such periods when the receiver is tuned to receive the coded signal.

Yet another object of this invention is to provide a receiver for the reception of such coded electrical signals, which receiver reproduces the coded signals upon the receipt of the associated key signals, and which receiver may be tuned to receive conventional uncoded electrical signals, with no further operations being necessary than those necessary to tune the receiver from one station to another.

A still further object of this invention is to provide a receiver for coded and uncoded electrical signals, in which receiver key signals for decoding the coded electrical signals are impressed upon decoding circuits in the receiver only during such periods when the receiver is tuned to receive the coded electrical signals.

The features of this invention, which are believed to be new, are set forth with particularity in the appended claims. The invention itself, however, together with further objects and advantages thereof may best be understood by reference to the following description, when taken in conjunction with the accompanying drawings, in which:

Copending application Number 773,843 by

Erwin M. Roschke, filed September 13, 1947, and entitled "Image Transmission System" assigned to the present assignee, discloses a signalling system in which coded electrical signals are radiated on a suitable carrier wave, and key signals for decoding the coded signals are transmitted to subscriber receivers over a wire line conductor. In such systems a subscriber receiver may be tuned to receive a coded signal, and upon request by the subscriber, key signals are transmitted to his receiver over the conductor to decode these signals. In these systems, when the subscriber tunes his receiver to receive conventional uncoded signals, the key signals continue to be received and distort these uncoded signals. It is, therefore, necessary for him to request that the transmission of key signals to his receiver be terminated. The present system contemplates the provision that all subscriber transmitters transmitting coded signals further transmit a standard identifying signal, which identifying signal causes switching devices at the respective subscriber receivers to close, and impress the key signals upon the decoding circuits in the receivers, only when such receivers are tuned to receive signals from any one of the subscriber transmitters. With such an arrangement, when a receiver is tuned to receive an uncoded signal, the standard signal is no longer received, and the key signals are automatically cut-off from the receiver.

Figure 1:
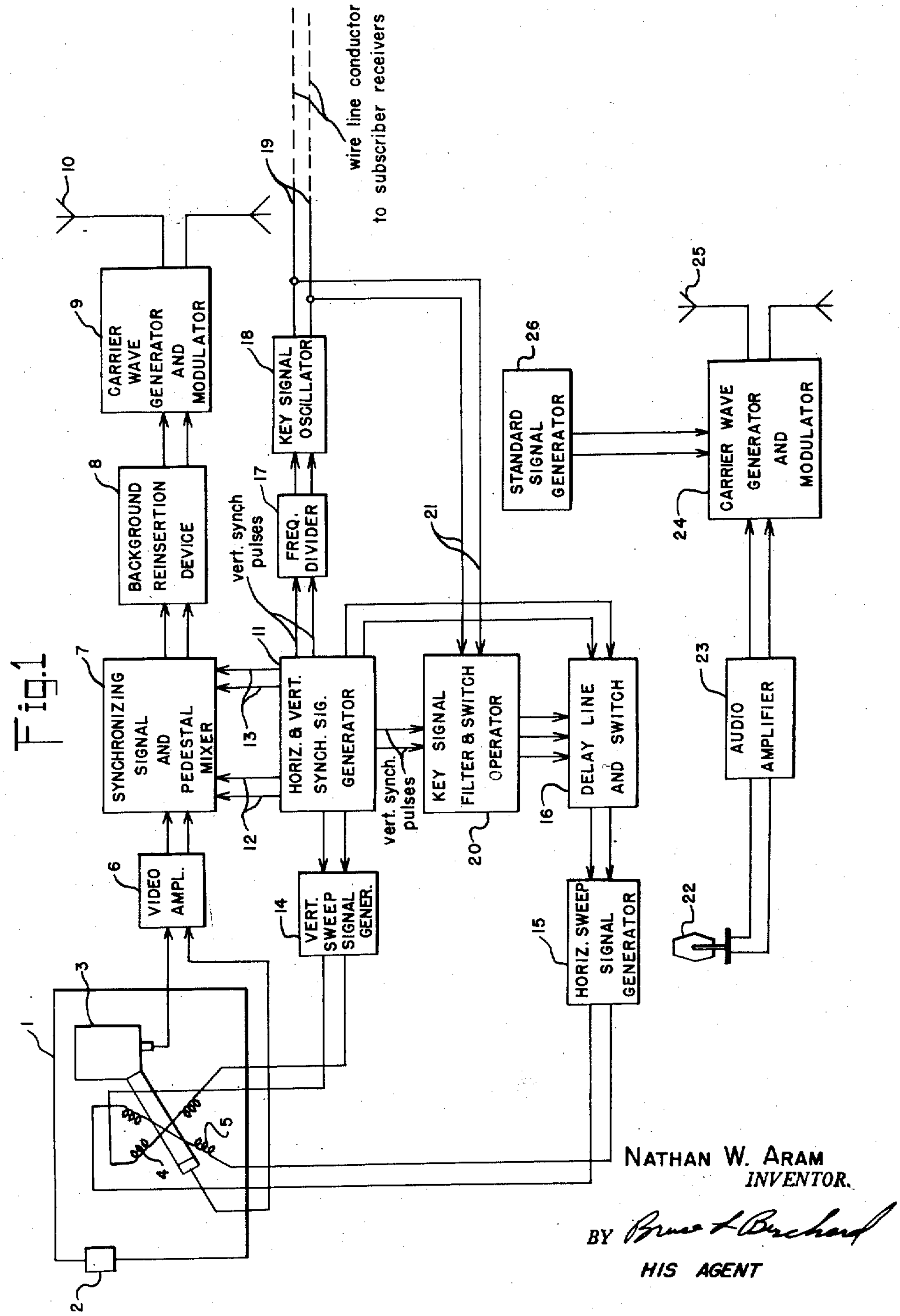
Figure 1 shows a transmitter embodying the invention.
Figure 2:
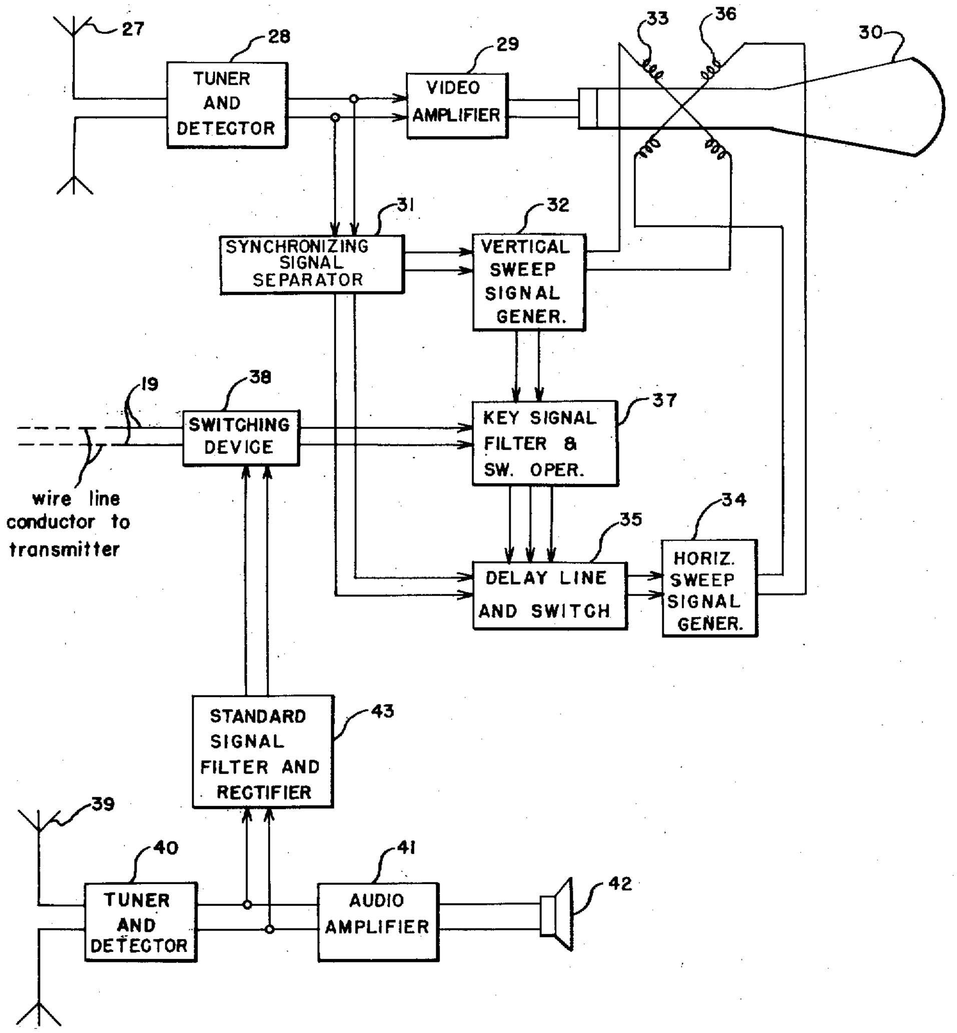
Figure 2 shows a receiver for operation with the transmitter of Figure 1.

One embodiment of the above mentioned arrangement, as applied to one of the coded signalling systems disclosed in the aforementioned application, is shown in Figure 1. The various components of the systems shown in Figure 1 and Figure 2 are either conventional or have been described in detail in the aforementioned application, and are hence shown in block form only as a detailed description thereof is believed to be unnecessary.

In the arrangement of Figure 1, a television camera 1 contains a usual lens system 2 for focusing an image upon a television pick-up tube 3, which tube may be of the iconoscope or image orthicon type, and which is provided with the usual vertical scanning coil 4 and horizontal scanning coil 5. Video signals developed by the iconoscope 3 are amplified by video amplifier 6, and thereafter transmitted through a signal and pedestal mixer 7, in which proper pedestals and synchronizing signals are added to the video signals. The signals from mixer 7 are transmitted to a background reinsertion device 8, and thence to a carrier wave generator and modulator 9 in which the signals, appropriately adjusted as to background level, are modulated on a suitable carrier wave and radiated from antenna 10.

Vertical and horizontal synchronizing signals are generated in vertical and horizontal synchronizing signal generator 11, and these signals are applied to the mixer 7 by way of leads 12 and 13, respectively. Vertical synchronizing signals from generator 11 are further impressed on vertical sweep signal generator 14, the output of which is applied to the vertical scanning coil 4 of tube 3. Horizontal synchronizing signals from generator 11 are applied to horizontal sweep signal generator 15 through delay line and switch 16, and the sweep output of generator 15 is impressed on the horizontal scanning coil 5 of tube 3, in the usual manner.

Vertical synchronizing signals from generator 11 are frequency divided in divider 17, and the frequency divided pulses are used to trigger key signal oscillator 18, a burst of key signal being obtained on conductor 19 for each pulse from frequency divider 17 impressed on oscillator 18. The conductor 19 is conveniently a telephone line, power line, or the like, the frequency of the key signal bursts being such that the key signal does not interfere with signals normally carried by these lines. The key signals from conductor 19 are impressed on key signal filter and switch operator stage 20 by way of leads 21, and in stage 20 the key signals are rectified and, together with vertical synchronizing signals from generators 11, cause the stage 20 to operate delay line and switch 16, in a manner described in the aforementioned application. Therefore, the television signal is coded due to the alterations in the timing of the video signals with respect to the synchronizing signals in the signals radiated by antenna 10, this coding being effected by the action of delay line and switch 16. In this system any change from normal transmission to transmission of the video signals in a delayed state is accompanied by a burst of key signal on conductors 19.

The audio signals associated with the video signals transmitted by the above described system are derived from microphone 22, and these audio signals are amplified in audio amplifier 23, the amplified signals being modulated on a suitable carrier wave in carrier wave generator and modulator 24, and radiated from antenna 25. A standard identifying signal is generated in standard signal generator 26, and this signal is modulated on the audio carrier in modulator 24, and radiated with the audio signals from antenna 25. The frequency of the standard signal is preferably out of the audio band so that it does not interfere with the audio signals. A convenient form of this standard signal would be a continuous 25,000 cycle signal. It is apparent that when so desired, the standard identifying signal may be modulated on the video carrier in stage 9 and radiated from antenna 10.

A receiver for receiving conventional uncoded television signals, and for receiving and reproducing coded television signals such as those transmitted by the transmitter of Figure 1 is shown in Figure 2. In this receiver, television signals are received by antenna 27, and these signals are tuned and detected in tuner and detector stages 28. The tuned and detected signals from stages 28 are amplified in video amplifier 29, and the amplified signals are impressed on a cathode ray image tube 30 in the usual manner.

Synchronizing signals are separated from the received television signals in signal separator stage 31, and vertical synchronizing signals from this separator are used to trigger the vertical sweep signal generator 32, the output of generator 32 being impressed across the vertical scanning coil 33 of tube 30. Horizontal synchronizing signals from separator 31 are applied to horizontal synchronizing signal generator 34 through delay line and switch 35, the output of generator 34 being impressed across horizontal scanning coil 36 of tube 30.

Key signals on conductor 19 are applied to key signal filter and switch operator 37 through a switching device 38, this device being of any known form. The operator 37 operates in synchronism with operator 20 of Figure 1 to actuate delay line and switch 35, so that any delay in the transmitted video signals is compensated by a similar delay in the horizontal synchronizing signals applied to generator 34, and hence in the horizontal scanning of tube 30. Switch operator 37 is actuated by the combined effect of rectified key signals and vertical blanking pulses, in a manner described in the aforementioned application, the vertical blanking pulses being derived from vertical sweep signal generator 32.

The audio signals associated with the received television signals are received on antenna 39, and these signals are tuned and detected in tuner and detector stages 40, amplified in audio amplifier 41, and reproduced in signal translating device 42. The previously mentioned standard identifying signal is recovered by means of filter and rectifier 43, this filter and rectifier being sharply tuned to the frequency of the standard signal. A unidirectional control potential is obtained from the filter and rectifier 43, and this control potential is impressed on switching device 38. The stage 38 is actuated in a usual manner by the control potential from filter and rectifier 43, and the arrangement is such that switch 38 passes key signals to the filter and operator 37 only in the presence of the control potential from rectifier 43.

Therefore, when the receiver is tuned to receive coded television signals such as those transmitted by the system of Figure 1, the standard signal, received with the audio signals associated with these television signals, causes device 38 to close the circuit, and the decoding key signals on conductor 19 to be impressed on filter and operator 37. The receiver therefore operates to decode and reproduce the coded signals. However, when the receiver is tuned away from the coded television signal to an uncoded, conventional television signal, the standard signal is no longer received and switching device 38 is de-energized and opens the circuit. Hence, the key signals are automatically cut-off from operator 37, and the delay line and switch 35 is no longer operated. Delay line and switch 35 is arranged to pass the horizontal synchronizing signals in an undelayed state to the generator 34 when it is not operated and, hence, the receiver reproduces the uncoded, conventional television signals. It is apparent that the standard identifying signal need not necessarily be transmitted with the audio signals in the above described system, and also that the invention is not necessarily limited to television systems. It is merely necessary to transmit the standard signal with the coded signal, so that key signals are impressed on subscriber receivers, only during such intervals when these receivers are tuned to receive the coded signals.

Therefore, while a certain specific embodiment of the invention has been shown and described, the invention is not limited thereto. It is intended in the appended claims to cover any such modifications as fall within the true spirit and scope of the invention.

I claim:

1. A subscription type of signal transmitter comprising: apparatus for producing at least two electrical signals representing intelligence to be transmitted to a distant point; a coding circuit coupled to said apparatus for coding at least one of said electrical signals in accordance with a coding schedule; means coupled to said apparatus for transmitting said electrical signals to said distant point; a generator coupled to said coding circuit for producing a key signal representing said coding schedule for transmission to said distant point over a line-circuit; a signal source for developing a signal to serve as an identification of the subscription transmitter; and means for applying said identifying signal to said transmitting means for transmission to said distant point concurrently with said electrical signals.

2. A subscription type of television transmitter comprising: apparatus for producing a television signal and a sound signal; a coding circuit coupled to said apparatus for coding at least one of said signals in accordance with a coding schedule; means coupled to said apparatus for transmitting said signals to a point remote from said transmitter; a first generator coupled to said coding circuit producing a key signal representing said coding schedule for transmission to said remote point over a line-circuit; a second generator for developing a signal to serve as an identification of the subscription transmitter; and means for applying said identifying signal to said transmitting means for transmission to said remote point combined with said sound signal.

3. A subscription type of television transmitter comprising: apparatus for producing a television signal; a coding circuit coupled to said apparatus for coding said television signal in accordance with a coding schedule; means coupled to said apparatus for transmitting said television signal to a point remote from said transmitter; a first generator coupled to said coding circuit for producing a key signal representing said coding schedule for transmission to said remote point over a line-circuit; apparatus for producing a sound signal; means for transmitting said sound signal to said remote point; a second generator for developing a signal to serve as an identification of the subscription transmitter; and means for applying said identifying signal to said sound-signal transmitting means for transmission to said remote point combined with said sound signal.

4. A subscription type of receiver for utilizing a coded electrical signal and an identifying signal received concurrently therewith over a first signal channel, and a key signal received over a line-circuit and representing the coding schedule of said coded signal, said receiver comprising: reproducing means; apparatus for supplying said electrical signal to said reproducing means; a decoding circuit coupled to said apparatus for decoding said coded signal in response to said key signal; a switching device coupling said line-circuit to said decoding circuits; and means coupled to said apparatus for applying said identifying signal to said switching device to cause said switching device to pass said key signal to said decoding circuit solely in the presence of said identifying signal.

5. A subscription type of television receiver for utilizing a television signal, a sound signal and an identifying signal, received concurrently over a first signal channel; and a key signal received over a line-circuit, at least one of said television and sound signals being coded in accordance with a coding schedule and said key signal representing said coding schedule, said receiver comprising: an image-reproducing device and a sound-reproducing device; apparatus for supplying said television signal and said sound signal to said respective devices; a decoding circuit coupled to said apparatus for decoding the coded one of said signals in response to said key signal; a switching device coupling said line-circuit to said decoding circuit; and means coupled to said apparatus for applying said identifying signal to said switching device to cause said switching device to pass said key signal to said decoding circuit solely in the presence of said identifying signal.

6. A subscription type of television receiver for utilizing a coded television signal, and a sound signal having an identifying signal combined therewith and received concurrently with said coded signal over a first signal channel, and a key signal representing the coding schedule of said television signal and received over a line-circuit, said receiver comprising: an image-reproducing device; apparatus for supplying said television signal to said image-reproducing device; a decoding circuit coupled to said apparatus for decoding said television signal in response to said key signal; a sound-reproducing device; apparatus for supplying said sound signal to said sound-reproducing device; a switching device coupling said line circuit to said decoding circuit; and means coupled to said last mentioned apparatus for separating said identifying signal from said sound signal and for applying said identifying signal to said switching device to cause said switching device as to pass said key signal to said decoding circuit solely in the presence of said identifying signal.

7. A subscription type of signalling system comprising a transmitter and a receiver; said transmitter including, apparatus for producing at least two electrical signals representing intelligence to be transmitted to said receiver, a coding circuit coupled to said apparatus for coding at least one of said electrical signals in accordance with a coding schedule, means coupled to said apparatus for transmitting said electrical signals to said receiver, a generator coupled to said coding circuit for producing a key signal representing said coding schedule for transmission to said receiver over a line-circuit, a signal source for developing an identifying signal to serve as an identification of the subscription transmitter, and means for applying said identifying signal to said transmitting means for transmission to said receiver concurrently with said electrical signals; and said receiver including, reproducing means, apparatus for supplying said electrical signals to said reproducing means, a decoding circuit coupled to said apparatus for decoding said coded signal in response to said key signal, a switching device coupling said line-circuit to said decoding circuit, and means coupled to said apparatus for applying said identifying signal to said switching device to cause said switching device to pass said key signal to said decoding circuit solely in the presence of said identifying signal.

NATHAN W. ARAM.

REFERENCES CITED

The following references are of record in the file of this patent:

UNITED STATES PATENTS

| Number | Name | Date |
|---|---|---|
| 1,754,876 | Clement | Apr. 15, 1930 |
| 1,790,486 | Roberts | Jan. 27, 1931 |
| 2,056,247 | Briggs | Oct. 6, 1936 |
| 2,136,789 | Finch | Nov. 15, 1938 |
| 2,242,633 | Toulon | May 20, 1941 |
| 2,251,525 | Rosenthal | Aug. 5, 1941 |
| 2,402,058 | Loughren | June 11, 1946 |
| 2,402,067 | Mathes | June 11, 1946 |
| 2,403,059 | Dillenback | July 2, 1946 |
| 2,419,568 | Labin | Apr. 29, 1947 |
| 2,472,774 | Mayle | June 7, 1949 |